UNITED STATES PATENT OFFICE.

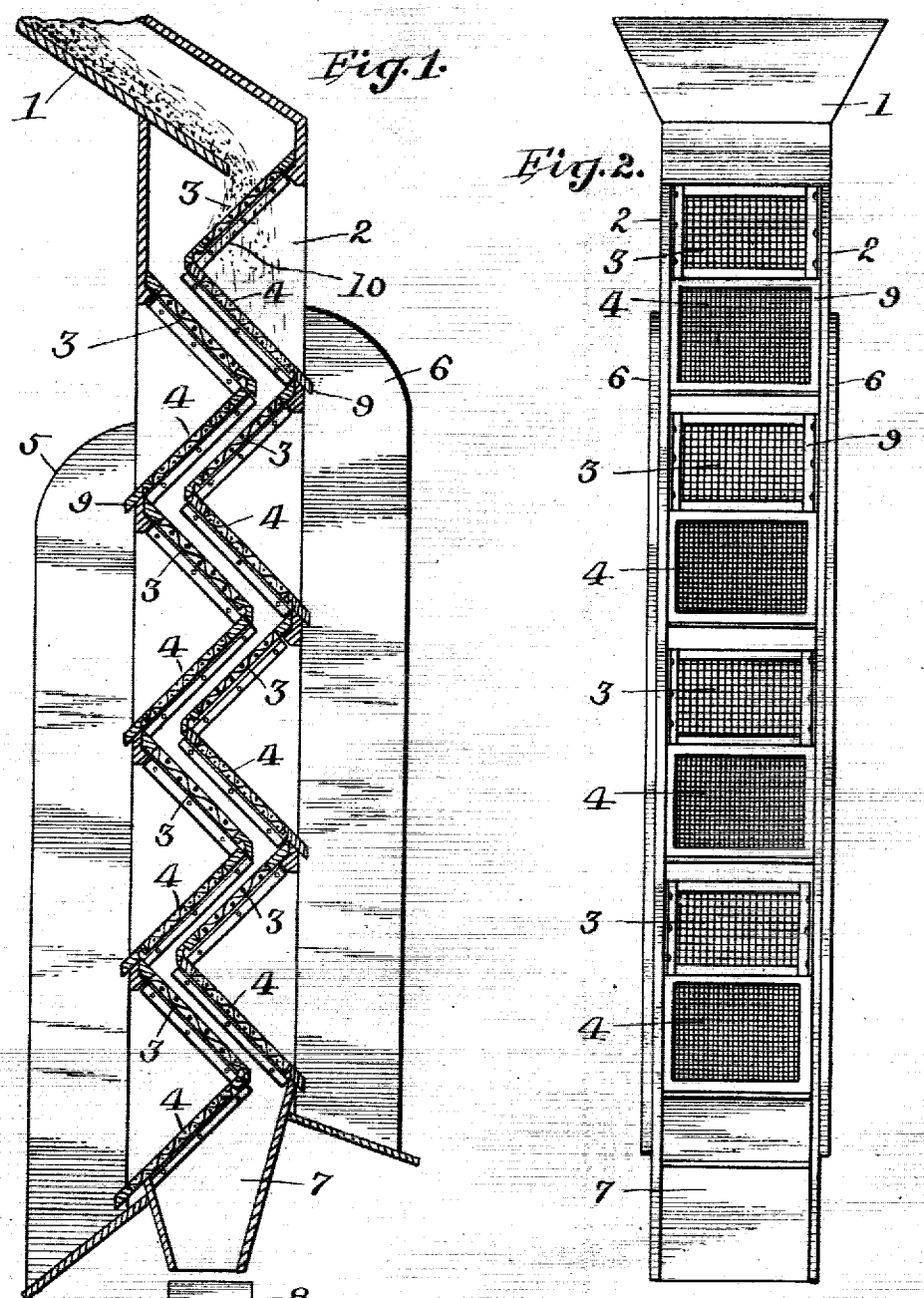

CHARLES U. SHEPARD, OF SUMMERVILLE, SOUTH CAROLINA.

MINERAL-SEPARATOR.

No. 853,603.        Specification of Letters Patent.        Patented May 14, 1907.

Application filed August 22, 1906. Serial No. 331,556.

*To all whom it may concern:*

Be it known that I, CHARLES U. SHEPARD, a citizen of the United States, and a resident of Summerville, South Carolina, have invented certain new and useful Improvements in Mineral-Separators, of which the following is a full, clear, and complete disclosure.

My invention relates to those classes of separators which are adapted to remove from minerals, such as phosphatic rock, particles of sand and other valueless materials, so that the phosphate in the phosphatic rock may be segregated and rendered useful for various commercial purposes.

My invention particularly relates to the separation of sand from particles of phosphate or phosphatic rock such as are found in the waste or tailings from the so-called "sand-screen" separators now employed in the art. These sand-screen separators comprise a revolving cage or cylinder of sheet metal having fine stamped openings therein. They are sometimes made of wire cloth of the requisite mesh in the form of a cylinder. These cylindrical separators separate the main body of the phosphatic rock from the waste material. This waste material, however, has always included more or less phosphatic rock which is still of considerable value, provided the same can be cheaply and efficiently separated from the sand and other valueless material.

As above stated, my invention applies particularly to recovering the valuable phosphatic material found in the tailings from the cylindrical sand-screen separators. I wish it to be understood, however, that I do not consider my improved apparatus as limited to this particular use, as many other materials may be efficiently treated by employing such apparatus.

Briefly, my invention comprises two zigzag series of screens composed of wire netting or stamped sheet metal, the said screens being arranged in such a manner that the water which carries the material in suspension, to be treated, may be active successively upon all of the screens, and so that the separation will take place over the complete series of screens.

For a full and exact description of one embodiment of my invention, reference may be had to the following specification and to the accompanying drawings forming a part thereof, of which Figure 1 is a central vertical-sectional view of my improved apparatus and Fig. 2 is an end elevation thereof.

Referring to the drawings, the numeral 1 indicates a suitable chute or hopper, through which the water containing the materials to be treated is fed to the apparatus. The numeral 2 indicates a pair of vertical standards or sides, between which extend two series of screens arranged parallel to each other, but in the form of steps or zig-zag lines, the sections of which are substantially at right angles to each other. These screens are alternately of fine and coarse mesh, the screens 3 being of coarse mesh and the screens 4 of fine mesh. I have successfully employed in one form of apparatus coarse and fine screens having, respectively, meshes of 1-24 and 1-50 of an inch.

Attached to the sides, 2, are splash boards, 5 and 6, which confine the water which falls downward, within the casing, and prevents the water from splashing out or escaping laterally. Below the series of screens, I provide a hopper as indicated at 7, so that the valuable material which is separated by the screens will fall into a suitable receptacle or car, as indicated at 8.

In operation, the water containing or mixed with the material to be treated falls through the chute, 1, and is discharged onto the first coarse screen, 3. This screen retains and separates a large proportion of the valuable phosphatic particles from the sand and other valueless materials, since the sand is of such a size as to pass through a screen of 1-24 inch mesh. The water which passes through this first coarse screen, 3, then falls onto the first fine screen, 4. This screen being of fine mesh, or about 1-50 of an inch, allows the water to pass therethrough, but does not allow the sand to pass therethrough. This sand then passes from the first fine screen, 4, and falls outside of the apparatus between the splash board, 6. The water which has passed through the first fine screen, 4, then falls upon the second coarse screen, 3. The valuable material which has been retained by the first coarse screen, 3, obviously is discharged from its lower edge upon the second coarse screen, 3, and as the water is also passing through this screen such material will be submitted to a second separating or sorting action, any further particles of sand which are here separated from the valuable material passing between the splash board, 5, and outside of the apparatus. This process is repeated successively, until the material which is retained by the coarse screen is successively treated by each of said screens, and is finally discharged at the bottom of the apparatus through the hopper, 7, into the car, 8, or other receptacle.

It should be noted that by the use of the above features of construction, the water is used successively over and over again, and thereby a large amount of separation is obtained, as well as a very complete separation, and at the same time a comparatively small amount of water is required. The screens themselves are preferably made in the form of rectangular frames, 9, which may be removably secured in position by any suitable means, such as cleats, 10, held in place by screws or similar means. Details of construction will be obvious to one skilled in designing such apparatus, and further description of the same is not deemed necessary. It is obvious that I may use screens of any meshes which are best suited to the material being treated by my improved separator, and I wish it to be understood that I do not desire to be limited to other details of construction shown and described herein, for obvious variations which may be embodied in my apparatus will occur to persons skilled in the art, without departing from the spirit and scope of my invention.

Having thus described my invention, what I claim and desire to protect by Letters Patent is:

1. In a separator for granular material, means for supplying granular material to be treated, two series of screens located parallel to each other and forming between said series a zig-zag path from the upper end to the lower end of the separator, the screens of each series being alternately of coarse and fine mesh, and a coarse screen of one series being located beneath a fine screen of the other series, so that the larger particles of the material are retained between the series of screens and the finer material is discharged from the fine screens.

2. In a separator for granular material, means for supplying a current of a mixture of liquid and said granular material, two series of screens located parallel to each other and forming between the same a zig-zag space from the top to the bottom of the separator, said screens being alternately of coarse and fine mesh and a screen of coarse mesh of one series being located immediately below a screen of fine mesh of the other series, so that the larger materials are confined to the space between the screens, while the finer material is discharged from the fine screens and so that liquid may pass successively through all of the screens.

In witness whereof, I have signed this specification, in the presence of two witnesses, this 18th day of August, 1906.

CHARLES U. SHEPARD.

Witnesses:
HARRIET T. JAMES,
ROSWELL D. TRIMBLE.